E. D. RODEMEYER.
ATTACHMENT FOR GRAIN BINDERS.
APPLICATION FILED MAR. 24, 1908.
899,619.  Patented Sept. 29, 1908.
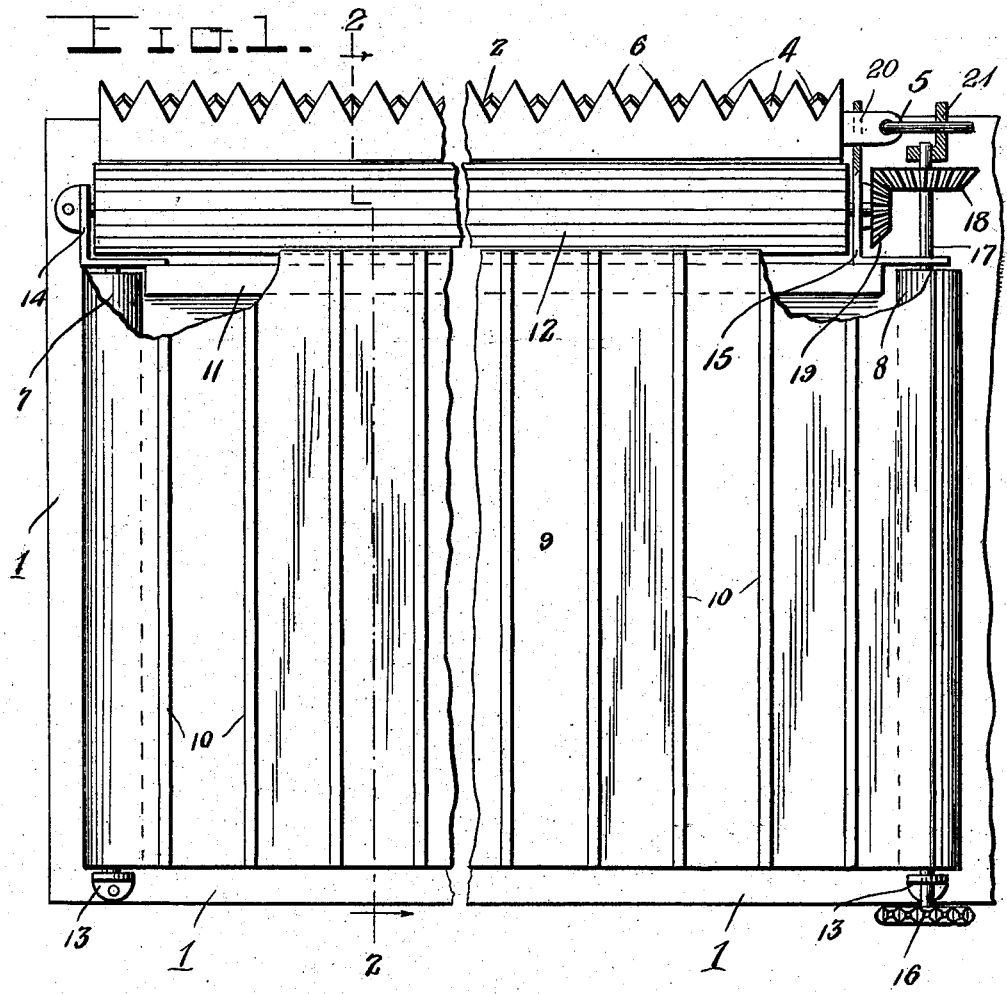
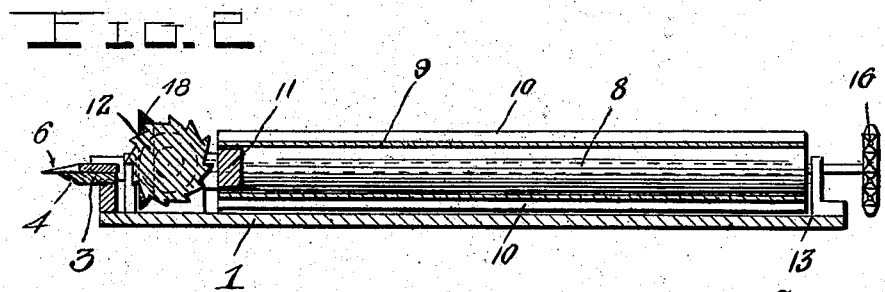
Witnesses
Chas. L. Griesbauer.
C. H. Griesbauer.
Inventor
Ernest D. Rodemeyer.
By H. B. Willson & Co.
Attorneys

UNITED STATES PATENT OFFICE.

ERNEST D. RODEMEYER, OF LATIMER, IOWA.

ATTACHMENT FOR GRAIN-BINDERS.

No. 899,619.

Specification of Letters Patent.

Patented Sept. 29, 1908.

Application filed March 24, 1908. Serial No. 422,923.

*To all whom it may concern:*

Be it known that I, ERNEST D. RODEMEYER, a citizen of the United States, residing at Latimer, in the county of Franklin and State of Iowa, have invented certain new and useful Improvements in Attachments for Grain-Binders; and I do declare the following to be a full, clear, and exact description of the invention, such as will enable others skilled in the art to which it appertains to make and use the same.

This invention relates to grain binders, and has for its object to provide an attachment between the sickle bar and the platform canvas to cause the grain to be quickly and effectually transferred from the cutting apparatus to the canvas, whereby the cutting apparatus is at all times cleared from the stubble of the cut grain and is left free for cutting.

For this and other objects as will appear hereinafter as the description proceeds my invention consists of certain novel arrangements and combinations of parts, of which the herein described attachment is an embodiment.

I do not limit myself to the specific details and arrangements hereinafter described, as the same may be greatly varied without departing from the spirit and scope of the invention.

In the annexed drawings forming a part of this specification, Figure 1 is a top plan view, and Fig. 2 is a sectional view taken on the line 2—2 of Fig. 1.

My attachment is shown on the platform 1 of a grain binder, or harvesting machine. The binding mechanism and the supporting members have been omitted as they form no part of the present invention. The platform 1 is provided at its forward end with the usual cutting mechanism 2, comprising the usual sickle bar 3, cutters 4, drive link 5 and guard fingers 6. The platform 1 is provided with an outer roller 7 and a drive roller 8, over which is mounted to carry the grain to the binding mechanism, the apron or canvas 9, across which may be secured if desired cleats 10. The forward end of the canvas is provided with a supporting bar 11, adapted to hold said canvas in proper relation to the relief roller 12, rotatably mounted between the cutting mechanism 2 and the supporting bar 11. The relief roller 12 may be grooved as is clearly shown in both figures, or it may be left plain if desired. At the rear ends of the rollers 7 and 8 are bearing brackets 13 adapted to support the rear end of said rollers. The forward ends of said rollers are provided with angled bearing brackets 14 and 15, these brackets being provided with bearings for the opposite ends of the roller 12 and the forward ends of the rollers 7 and 8, the bar 11 being secured at each end to said brackets, as clearly shown.

The roller 8 is provided with a rear drive sprocket 16, by which motion is communicated thereto from the driving mechanism of the harvesting machine. The forward end of said roller is provided with a stub shaft 17 projecting forward into substantial alinement with the forward edge of the roller 12. On the inner end of this stub shaft is rigidly secured the bevel gear 18 adapted to intermesh with the bevel gear 19 similarly connected with the roller 12. The gear 18 is provided with a larger number of teeth than the gear 19, and the roller 12 is thus caused to rotate faster than the roller 8. These gears may be provided with any number of teeth desired, but I prefer to provide the gear 18 with eighteen teeth and the gear 19 with twelve teeth. The object of this is to cause the roller 12 to rotate one-third faster than the roller 8 to enable it to throw the grain on the platform or canvas before it is taken away.

If desired, the bracket 15 may be extended and provided with a perforation 20 to slidably receive the sickle bar. A bracket 21 is provided to rotatably support the free end of the shaft 17 and to slidably support the sickle bar.

It is thought that the operation of my device will be understood from the foregoing description.

In operation the rotation of the roller 12 causes the surface of said roller to engage the stubble end of the grain and throw the grain back on the canvas apron 9. The cutting mechanism 2 is thus always kept free from grain, thus causing the operation of the cutting mechanism to be sure and easier, thus making the draft of the harvesting machine lighter and causing less wear on the various parts of the machine.

Having thus described my invention, what I claim as new and desire to secure by Letters-Patent is:—

In a harvester, a binding means, a platform, a cutting mechanism on the forward end of said platform, an outer roller and a drive roller rotatably mounted on said platform, means to rotate said drive roller, a grooved relief roller extending longitudinally of said cutting mechanism immediately to the rear thereof, angled brackets supporting the adjacent ends of said outer and drive rollers and said grooved roller, bevel gear connection between said drive roller and said grooved roller, whereby said grooved roller is caused to rotate faster than said drive roller, a canvas supported and moved by said drive roller and outer roller, a bar fastened to said angled brackets and lying immediately to the rear of said grooved roller, the forward edge of said canvas lying on said bar and immediately to the rear of said roller.

In testimony whereof I have hereunto set my hand in presence of two subscribing witnesses.

ERNEST D. RODEMEYER.

Witnesses:
F. D. SMITH,
CHAS. JOHNSON.